United States Patent Office 2,892,857
Patented June 30, 1959

2,892,857

CHEMICAL PROCESS

George G. Ecke, Ferndale, Mich., and Lloyd R. Buzbee, Huntington, W. Va., assignors to Ethyl Corporation, New York, N.Y., a corporation of Delaware No Drawing. Application September 6, 1956
Serial No. 608,189

4 Claims. (Cl. 260—438)

This invention relates to the preparation of novel and useful organic compounds, namely, aromatic penetration complexes of chromium.

Heretofore, dibenzene chromium—an aromatic penetration complex of chromium—has been prepared on a small scale by an intricate and difficult process. Thus, dibenzene chromium has been, until now, only a laboratory curiosity. An elegant process of preparing aromatic penetration complexes of chromium has now been discovered which enables the preparation of these compounds in large quantities and without any difficulties. By virtue of this process, substantial quantities of various aromatic penetration complexes of chromium have been made available and have been found to have novel and highly useful properties.

Among the objects of this invention is that of providing a process of preparing aromatic penetration complexes of chromium. Another object is to provide a process of preparing neutral aromatic penetration complexes of chromium. A further object of this invention is to provide novel and highly useful aromatic penetration complexes of chromium. Other important objects of this invention will be apparent from the ensuing description.

According to this invention there is provided the unprecedented process of preparing aromatic penetration complexes of chromium which comprises heating under an inert, elemental gas to a temperature between about 80 and 300° C. and in the presence of an amalgam of a finely-divided metal from magnesium to zinc inclusive in the electromotive series, an anhydrous mixture of chromium halide, an aromatic hydrocarbon and an inorganic salt possessing electrophilic characteristics, the halogen in said salt having an atomic weight no greater than 80, and the metal in said salt being capable of reducing a chromium cation to a lower valence state, and then hydrolyzing the reaction mixture. This process leads to the preparation of aromatic penetration complexes of chromium in high yield and of high purity. Furthermore, the process is very readily carried out and is readily adapted to the large-scale preparation of these complexes.

One feature of the present process which renders it so ideally suited to the preparation of aromatic complexes of chromium is the presence in the reaction system of an amalgam of a finely divided metal from magnesium to zinc inclusive in the electromotive series—viz., magnesium, beryllium, aluminum, manganese or zinc. It has been found, for example, that these finely-divided amalgamated metals permit the reaction to be carried out at atmospheric pressure in common laboratory glassware. On the other hand, if the finely-divided metal is not amalgamated, the reaction is carried out only with considerable difficulty. If this finely-divided metal is omitted from the reaction system entirely, no reaction occurs. It is preferable that this finely-divided amalgamated metal be present in the reaction mixture at least as soon as the reaction is commenced. However, it has been also found possible to carry out the reaction in two steps. Thus, another embodiment of this invention is the process of preparing aromatic penetration complexes of chromium which comprises heating under an inert, elemental gas to a temperature between about 80 and 300° C., an anhydrous mixture of a chromium halide, an aromatic hydrocarbon and an inorganic halide salt as described above, then mixing with the reaction mixture an amalgam of a finely-divided metal from magnesium to zinc inclusive in the electromotive series, heating the resulting mixture and then hydrolyzing the same.

Two general types of aromatic penetration complexes of chromium are formed in the present process. The first type is the neutral aromatic penetration complexes of chromium in which two uncharged aromatic nuclei are complexed with a chromium atom. Dibenzene chromium serves as an example. This compound is readily distinguished from diphenyl chromium in that in the former the central chromium atom assumes the krypton configuration by a coordinative, covalent incorporation of three pi electron pairs of each of the aromatic nuclei. Such an electronic configuration is, of course, not present in diphenyl chromium.

The second type of complex prepared by the present process is the univalent cation type of penetration complex in which two uncharged aromatic nuclei are complexed with a chromium atom which is in the oxidized (plus 1) state. Such cations readily form ionic compounds with negatively charged anions. Thus, a novel and highly important feature of the present process is that it can lead to the concurrent preparation of both of these types of aromatic penetration complexes of chromium. Moreover, another feature is that by appropriately controlling the reaction conditions, either of these types of complexes can be caused to predominate in the reaction mixture. In fact, under certain conditions either of these types of complexes can be formed to the virtual exclusion of the other. Moreover, methods of readily converting either type of complex to the other have been discovered and form another part of this invention.

A preferred embodiment of this invention, therefore, is the process of preparing neutral aromatic penetration complexes of chromium which comprises heating under an inert, elemental gas to a temperature between about 80 and 300° C. and in the presence of an amalgam of a finely-divided metal from magnesium to zinc inclusive in the electromotive series, an anhydrous mixture of chromium halide, an aromatic hydrocarbon and an inorganic halide salt as described above, hydrolyzing the reaction mixture to form a mixture of (1) a univalent cation in which two uncharged aromatic nuclei are complexed by pi-bonding with a chromium atom and (2) a neutral aromatic penetration complex in which two uncharged nuclei are complexed with a chromium atom, and reducing (1) to (2). To effect the reduction step a particularly efficacious reducing agent is nickel-aluminum alloy containing from 25 to about 75 percent of nickel with the remainder being essentially aluminum. This reducing agent works especially well when in the presence of an aqueous solution of an alkali metal hydroxide, such as sodium hydroxide. This reducing system can be applied with excellent results to the reduction of univalent cation types of penetration complexes in which two uncharged aromatic nuclei ar pi-bonded with a chromium atom irrespective of the method by which these complexes have been prepared. Thus, another part of this invention is the process of preparing neutral aromatic penetration complexes of chromium which comprises reducing a univalent chromium cation in which two uncharged aromatic nuclei are pi-bonded with a chromium atom with a nickel-aluminum alloy as described above in the presence of an aqueous solution of an alkali metal hydroxide.

When carrying out this reduction process, an aromatic chromium salt—dibenzene chromium iodide, di-biphenyl chromium chloride, ditoluene chromium acetate, dixylene chromium bromide, etc.—is dissolved in an aqueous alkali metal hydroxide solution. Five to ten percent aqueous solutions of sodium hydroxide, potassium hydroxide, cesium hydroxide, rubidium hydroxide or lithium hydroxide are suitable for this purpose. The univalent aromatic chromium cation is then contacted at a temperature between about 20 and about 100° C. with the nickel aluminum alloy which is preferably in a subdivided state. This is readily accomplished by adding the alloy to the above aqueous solution while keeping the temperature in the range above specified. The univalent aromatic chromium cation is then contacted at a temperature between about 20 and about 100° C. with the nickel-aluminum alloy which is preferably in a subdivided state. This is readily accomplished by adding the alloy to the above aqueous solution while keeping the temperature in the range above specified. The univalent aromatic chromium cation is thereby smoothly and efficiently reduced to the neutral state. Simple extraction and evaporation procedures lead to the separation and recovery of the neutral complex in high yield and purity.

Among the advantages of this invention is that for the first time there has been provided a simple, efficient and safe process of preparing extremely unusual compounds possessing unique and important properties. For example, this process when conducted on a small scale, such as in the laboratory, can be readily carried out in conventional laboratory glassware. On the other hand, the present process is simply and effectively geared to the large-scale preparation of the above chromium complexes, since it can be readily carried out in large reaction equipment, such as autoclaves or the like. Furthermore, a highly flexible process has been provided enabling the preparation of either of the above types of complexes of chromium by the simple expediency of adjusting the reaction conditions in the manner described below.

The chromium halides used in the instant process are preferably trivalent chromium halides, such as chromic bromide, chromic fluoride and especially chromic chloride because high yields are achieved by the use of these halides. However, divalent chromium halides, such as chromous chloride, chromousfluoride, chromous iodide, etc., can be used.

It is desirable that the aromatic hydrocarbons used in the present process contain up to about 18 carbon atoms and preferably up to about 12 carbon atoms. Aromatic hydrocarbons containing more than about 18 carbon atoms can in some cases be used but the reaction proceeds with some difficulty. Typical aromatic hydrocarbons which can be used include benzene, diphenyl, naphthalene, 1,2,3,4-tetrahydronaphthalene, indene, fluorene, anthracene, toluene, xylenes, mesitylene, ethylbenzene, hexamethylbenzene, alkylated naphthalenes, alkylated anthracenes, and the like.

The inorganic halide salts used in the present process possesses an electrophilic character. It also contains halogen which has an atomic weight no greater than 80—i.e., fluorine, chlorine, and bromine. Furthermore, the metal of this salt is capable of reducing a chromium cation—$Cr^{+++}$, $Cr^{++}$—to a lower valence state. Accordingly, suitable inorganic halide salts meeing this requirement include aluminum chloride, aluminum bromide, magnesium chloride, magnesium bromide, zinc fluoride, zinc chloride, zinc bromide, boron trifluoride, boron trichloride, titanium tetrachloride, titanium tetrabromide, zirconium tetrachloride, zirconium tetrabromide, and the like.

The finely-divided amalgamated metal used in this process apparently acts as a reductant. These finely-divided amalgams are readily prepared by contacting finely-divided aluminum, magnesium, zinc, beryllium or manganese—e.g., powders, turnings, chips, etc.—with liquid mercury. While these amalgams can be preformed, it is preferable to form them in situ. This is readily done by adding to the reaction system containing the finely-divided metal a small amount of metallic mercury or preferably a mercuric salt, such as mercuric chloride, and treating the mixture. It is also preferable to use a reductant, the metal (other than mercury) of which is the same as that present in the inorganic halide salt referred to above, wherever this is possible. In this manner an interchange of metal between the reductant and the inorganic halide salt is thereby avoided.

In carrying out the present process it is desirable to use a stoichiometric amount of the inorganic salt and the chromium halide, an excess of the aromatic hydrocarbon, and it is preferable to use about 2 to 3 equivalents of the amalgamated finely-divided metal based upon the chromium halide. However, smaller amounts of the amalgam can be used at the expense of the reaction rate.

The inert elemental gas used in this process is preferably nitrogen, although any of the rare gases—argon, neon, krypton, etc., can be used.

The reaction temperature used is dependent upon the aromatic hydrocarbon and the metal which is amalgamated with mercury. Thus, if the aromatic hydrocarbon is benzene, the reaction temperature is limited to about 80° C., the boiling point of this aromatic hydrocarbon at atmospheric pressure. Of course, higher temperatures can be used even at atmospheric pressure when using aromatic hydrocarbons of higher molecular weight. When using an aluminum amalgam as the reductant, the reaction temperature need not be as high as when a manganese amalgam is used. In other words, the reaction temperature employed when amalgams of zinc, beryllium or manganese are used should be higher than when amalgrams of aluminum or magnesium are used. As pointed out above, the reaction temperature ranges from about 80 to about 300° C.

The reaction time largely governs the type of aromatic penetration complex of chromium that is obtained. Short reaction times favor the formation of the univalent cation-type while long reaction times favor the formation of the neutral chromium complexes. Intermittent reaction times result in the formation of mixtures of both types of chromium complexes. Thus, to prepare the univalent cations, it is desirable to use a reaction time ranging from about 1 to about 3 hours. To prepare the neutral chromium complexes, the reaction times should be from about 50 to 72 hours. In between these extremes there are formed mixtures of varying proportions of the two types of chromium complexes. Slight deviations from these reaction times will be dictated by the electro-negativity of the amalgamated metal, reaction temperature and ratio of the reactants.

The process of this invention will be further apparent from the following specific examples in which all parts are by weight.

*Example 1*

An aluminum amalgam was made by heating 6.0 parts of mercuric chloride and 10.8 parts (0.4 mols) of powdered aluminum in 200 parts of benzene under nitrogen. When all the mercuric chloride had disappeared, 15.7 parts (0.1 mole) of chromic chloride, 150 parts of benzene, and 15 parts of aluminum chloride were added. The mixture was refluxed for an hour with occasional stirring, then was allowed to stand at room temperature for 14 hours. After another hour of refluxing, no more chromic chloride could be seen in the mixture. It was then hydrolyzed under nitrogen with air free (distilled) water. The excess aluminum and the aluminum hydroxide formed upon hydrolysis were filtered out. The benzene layer was extracted with water until colorless and discarded. The water layer was made slightly basic (pH of 8) with sodium hydroxide and the hydroxides of chromium and aluminum were filtered off. The filtrate was concentrated under vacuum and the dibenzene chromium iodide was precipitated by adding solid potassium iodide. 0.15 part of product was obtained at this point.

The hydroxide precipitate was treated with 20 percent sodium hydroxide upon which part of the hydroxides dissolved. The slurry was filtered and the remaining hydroxides were washed with water. A yellow solution was thus obtained. The filtrate was neutralized and filtered, yielding more yellow solution. The solids from the above process were again treated in the same manner. The yellow solutions obtained were concentrated under vacuum and solid potassium iodide was added. An additional 8.34 parts were obtained by working up the solids in this manner, bringing the total yield to 8.5 parts or 25.4 percent. *Analysis.*—Calcd. for $C_{12}H_{12}CrI$: C, 43.0; H, 3.61; Cr, 15.5. Found: C, 42.4; H, 3.71; Cr, 15.5.

*Example II*

An aluminum amalgam is prepared by heating 6 parts of mercuric chloride and 10.8 parts of powdered aluminum in 200 milliliters of mesitylene under nitrogen. When the mercuric chloride has disappeared, 15.7 parts of chromic chloride, 150 parts of mesitylene and 15 parts of aluminum chloride are added. The mixture is refluxed with occasional stirring for three hours and allowed to stand for 12 hours at room temperature. After another two hours of refluxing, the mixture is hydrolyzed under nitrogen with distilled water. The solids are filtered off and the organic layer extracted with water until colorless. The resulting water layer is made slightly basic with sodium hydroxide solution and the chromium and aluminum hydroxides filtered off. The filtrate is concentrated under vacuum and the dimesitylene chromium iodide precipitated by addition of potassium iodide. The aluminum and chromium hydroxide precipitates are treated as described in Example I and additional dimesitylene chromium iodide isolated from the filtrates.

*Example III*

A mixture of 3.4 parts (0.021 mole) of chromic chloride, 1.5 parts (0.055 mole) of aluminum turnings amalgamated by adding 6 parts of mercuric chloride, 1.0 part of aluminum chloride, and 150 parts of biphenyl are charged to a 500 part, 3-neck flask equipped with a paddle stirrer, thermometer, condenser and a nitrogen seal. The mixture is heated with stirring under a nitrogen atmosphere to 241° C. in 2 hours and held there for ½ hour. After cooling to 80° C., about 500 parts of benzene were added and the reaction mixture chilled in an ice bath and hydrolyzed with approximately 350 parts of water. The separated water phase is made slightly basic with sodium hydroxide solution to precipitate the aluminum and chromium. After filtering off the hydroxides, the filtrate is treated with solid potassium iodide until a precipitate forms. The air-dried precipitate is analyzed for chromium and iodine and corresponds to dibiphenyl chromium iodide having the empirical formula $C_{24}H_{20}CrI$ which contains 10.6 percent of chromium and 26.0 percent of iodine.

*Example IV*

A mixture of 15.7 parts of chromic chloride, 10.8 parts of powdered aluminum which has been amalgamated with 6 parts of mercuric chloride, 15 parts of aluminum chloride and 200 parts of hexamethyl benzene are heated at 220° with intermittent stirring for 2 hours. After cooling to 80°, 500 parts of benzene are added and the mixture hydrolyzed with water. The water layer is separated and the aluminum and chromium precipitated by addition of sodium hydroxide solution. These solids are filtered off, the filtrate concentrated and solid potassium iodide added until the dihexamethyl benzene chromium iodide is precipitated.

*Example V*

A zinc amalgam is prepared by heating 6 parts of mercuric chloride and 25 parts of zinc metal in 200 parts of mesitylene. To this is added 15.7 parts of chromic chloride, 150 parts of mesitylene and 15 parts of aluminum chloride. The mixture is refluxed for three hours with occasional stirring and allowed to stand at room temperature for 12 hours. After two additional hours of refluxing the mixture is hydrolyzed with distilled water and filtered. The benzene layer is extracted with water which is combined with the original water layer. Then, this layer is made slightly basic with sodium hydroxide solution and the hydroxides of zinc and chromium filtered off. The filtrate is concentrated under vacuum and the dimesitylene chromium iodide precipitated by addition of potassium iodide.

*Example VI*

The procedure of Example I is repeated with the exception that the reaction mixture is refluxed for a total of 96 hours. At the end of this time the mixture is hydrolyzed with distilled water and dibenzene chromium isolated from the benzene layer as the major product by evaporation and sublimation.

*Example VII*

Dibiphenyl chromium is prepared by carrying out the procedure of Example III modified to the extent that the reaction mixture is heated for a total of 72 hours. At the end of this time, the mixture is hydrolyzed with distilled water and the dibiphenyl chromium isolated from the benzene layer by evaporation and sublimation.

*Example VIII*

An aluminum amalgam is prepared by heating 6 parts of mercuric chloride and 10.8 parts of powdered aluminum in 200 parts of tetralin under nitrogen. To this is added 15.7 parts of chromic chloride, 150 parts of tetralin and 15 parts of aluminum chloride. This mixture is refluxed for 72 hours and then hydrolyzed under nitrogen with distilled water. The tetralin layer is separated, evaporated at reduced pressure and the residue vaporized to give ditetralin chromium as the major product.

*Example IX*

To prepare dihexaethylbenzene chromium, the following procedure is used. An aluminum amalgam is prepared from 10.8 parts of aluminum and 6 parts of mercuric chloride under nitrogen. To this is added 300 parts of hexaethylbenzene, 15 parts of aluminum chloride and 15.7 parts of chromic chloride. The resulting mixture is stirred intermittently at 200° C. for 72 hours. At the end of this time, the mixture is cooled to room temperature and 500 parts of benzene added. The resulting mixture is hydrolyzed with distilled water, filtered and the organic layer separated. This layer is subjected to vacuum distillation and the residues to vacuum sublimation to give dihexaethylbenzene chromium as the major product.

*Example X*

The procedure of Example IX is repeated except that 9.6 parts of magnesium chloride and 7.2 parts of amalgamated manganese are used in place of aluminum chloride and aluminum amalgam. Dihexaethylbenzene chromium is recovered from the reaction mixture in the manner described in Example IX.

*Example XI*

An aluminum amalgam is prepared by heating 6 parts of mercuric chloride and 10.8 parts of powdered aluminum in 200 parts of benzene under nitrogen. To this is added 15.7 parts of chromic chloride, 150 parts of benzene and 15 parts of aluminum chloride. This mixture is refluxed for 24 hours and then hydrolyzed with distilled water. The benzene layer is separated, evaporated and the residues sublimed to give dibenzene chromium as the only product. The water layer is made slightly basic with sodium hydroxide and the hydroxides of chromium and aluminum filtered off. The filtrate is concentrated under vacuum and dibenzene chromium iodide precipitated by the addition of solid potassium iodide. The dibenzene iodide is dissolved in 10 percent sodium hydroxide solution at 50° C. and 3 parts of 50 percent nickel-aluminum alloy added incrementally. The resulting mixture is extracted with benzene, the benzene evaporated and the residue sublimed to give dibenzene chromium.

*Example XII*

An aluminum amalgam is prepared by heating 10.8 parts of powdered aluminum with 6 parts of mercuric chloride in 200 parts of ethylbenzene while under nitrogen. To this is added 15.7 parts of chromic chloride, 150 parts of ethylbenzene and 15 parts of aluminum chloride. The mixture is refluxed for 16 hours with occasional stirring and then hydrolyzed with distilled water. The benzene layer is separated, evaporated and the residues sublimed to give diethylbenzene chromium. The water layer is made slightly basic with sodium hydroxide solution, the hydroxides of chromium and aluminum filtered off, the filtrate concentrated under vacuum and the diethylbenzene chromium iodide precipitated by addition of solid potassium iodide. The diethylbenzene chromium iodide is dissolved in 10 percent sodium hydroxide at 50° C. and 3 parts of 50 percent nickel-aluminum alloy added incrementally. The resultant mixture is extracted with benzene, the benzene evaporated and the residues sublimed to give diethylbenzene chromium.

The aromatic penetration complexes of chromium prepared according to this invention are particularly useful in the chemical and allied arts. As shown by Examples XI and XII, the univalent cation chromium penetration complexes are very useful as chemical intermediates leading to the formation of the neutral aromatic penetration complexes. Thus, the cation type of compound is readily reduced by means of the nickel-aluminum alloy system referred to above to form the neutral compounds.

The neutral compounds are especially useful in vapor phase chromium plating operations as applied to steel and related ferrous metals. In carrying out these vapor phase techniques, the object to be chromium plated is heated to a temperature above about 300° C. while maintained under an inert atmosphere, such as hydrogen. A neutral aromatic penetration complex of chromium is introduced into the plating zone. As the complex impinges upon the hot metallic surfaces, it is thermally decomposed and thereby lays down a film of chromium on the heated object. A particular advantage of using these neutral complexes in this manner is that the chromium plate is free of oxides of chromium and thus leads to the formation of a highly desirable chromium plate. This procedure is readily adapted to the vapor phase chromium plating of gears, ball bearings, crankshafts, and the like.

The neutral penetration complexes are also especially useful in powered metallurgy—i.e., in the formation of highly pure powdered chromium which is free of contamination by other metals. This is readily accomplished by forming the neutral aromatic penetration complexes of chromium which are then hydrogenated at elevated temperatures to liberate the aromatic hydrocarbon and powdered chromium in highly pure form. This procedure not only results in the formation of pure chromium by up-grading crude chromium salts, but efficiently and effectively causes separation of chromium from metals with which it is normally admixed.

As pointed out above, the process of this invention is rendered so ideally suited to the preparation of the aromatic penetration complexes of chromium by the use of the particular amalgamated, finely-divided metals as reductants. For example, these amalgams enable the process to be carried out at atmospheric pressure in common laboratory glassware. However, it has also been found possible to prepare the chromium complexes by the use of a finely-divided metal from magnesium to zinc inclusive in the electromotive series, even though this metal has not been amalgamated. This is a less desirable procedure, however, because more vigorous reaction conditions are normally required as contrasted to those used when a finely-divided metallic amalgam is used as the reductant. Nevertheless, it has been found that the dibenzene chromium cation could be prepared in an autoclave by mixing under anhydrous conditions chromic chloride, aluminum turnings, aluminum chloride and benzene, and heating this mixture to 200° C.—the mixture developing a pressure of 155 p.s.i.g. In like manner, dibiphenyl chromium chloride may be prepared by heating a mixture of chromic chloride, biphenyl and aluminum chips in the presence of aluminum chloride.

The chromium complexes prepared according to this invention are useful as additives to motor fuels. For example, the neutral complexes and the fuel-soluble cationic complexes act as surface ignition control additives when dissolved in gasoline. Thus, when such compounds as dibenzene chromium, dibenzene chromium chloride, dibiphenyl chromium acetate, etc. are dissolved in clear—unleaded—gasoline, the resulting fuel composition when used in a spark ignition engine reduces the surface ignition rate caused by previously accumulated engine deposits. For this purpose, the aromatic penetration complexes of chromium should be blended with the fuel in amount such that there is from about about 0.001 to about 0.5 percent by weight of chromium based on the weight of the gasoline. These aromatic penetration complexes of chromium also effectively control surface ignition when dissolved in the same concentration range in leaded gasoline, i.e., gasoline containing from about 0.02 to about 6.34 grams of lead per gallon as a lead alkyl antiknock agent. In this utility, the control of surface ignition is the result of the cooperation during engine combustion between the lead alkyl antiknock agent, the chromium complex, and the products of combustion thereof. An advantage of this utility is that the surface ignition rate is continuously suppressed by virtue of the conjoint presence in the gasoline of the alkyl lead antiknock agent and the aromatic penetration complex of chromium.

We claim:

1. Process of preparing aromatic penetration complexes of chromium wherein the aromatic portion of the molecule consists of aromatic hydrocarbons having up to 18 carbon atoms each, which process comprises heating under an inert, elemental gas to a temperature between about 80 and 300° C. in the presence of an amalgam of a finely divided metal selected from the group consisting of magnesium, beryllium, aluminum, manganese, and zinc, and anhydrous mixture of a chromium trihalide, an aromatic hydrocarbon having up to 18 carbon atoms in the molecule and an inorganic metal halide salt possessing electrophilic characteristics and selected from the group consisting of aluminum, magnesium, boron, zinc, titanium and zirconium halides, the halogen in said salt having an atomic weight no greater than 80 and the metal in said salt being capable of reducing trivalent chromium cation to the monovalent state; and then hydrolyzing the reaction mixture.

2. Process of preparing neutral aromatic penetration complexes of chromium wherein the aromatic portion of the molecule consists of aromatic hydrocarbons having up to 18 carbon atoms each, which process comprises heating under an inert, elemental gas to a temperature between about 80 and 300° C. and in the presence of an amalgam of a finely divided metal selected from the group consisting of magnesium, beryllium, aluminum, manganese and zinc, an anhydrous mixture of a chromium trihalide, an aromatic hydrocarbon having up to 18 carbon atoms in the molecule and an inorganic metal halide salt possessing electrophilic characteristics and selected from the group consisting of aluminum, magnesium, zinc, boron, titanium, and zirconium halides, the halogen in said salt having an atomic weight of no greater than 80 and the metal in said salt being capable of reducing a trivalent chromium cation to the monovalent state; hydrolyzing the reaction mixture to from a mixture of (1) an univalent cation in which two aromatic nuclei are complexed by pi-bonding with a chromium atom and (2) a neutral aromatic penetration complex in which two uncharged aromatic nuclei are complexed with a chromium atom; and reducing (1) to (2) in the presence of a nickel-aluminum alloy.

3. Process of claim 2 wherein (1) is reduced to (2) by contacting said univalent cation with a nickel-aluminum alloy in the presence of an aqueous solution of an alkali metal hydroxide.

4. Process of preparing neutral aromatic penetration complexes of chromium wherein the aromatic portion of the molecule consists of an aromatic hydrocarbon having up to 18 carbon atoms which comprises contacting a univalent chromium cation in which two uncharged aromatic nuclei are complexed with a chromium atom, with a nickel-aluminum alloy in the presence of an aqueous solution of an alkali metal hydroxide.

References Cited in the file of this patent

Chemical Reviews, vol. 55, February–June 1955, pages 563, 571.

Zeiss et al.: Journ. Am. Chem. Soc., vol. 78, #22, November 20, 1956, page 5959.